F. W. ADSIT AND B. B. BIENHOFF.
MOTOR SPEED CONTROL.
APPLICATION FILED MAR. 1, 1919.
1,367,679.
Patented Feb. 8, 1921.
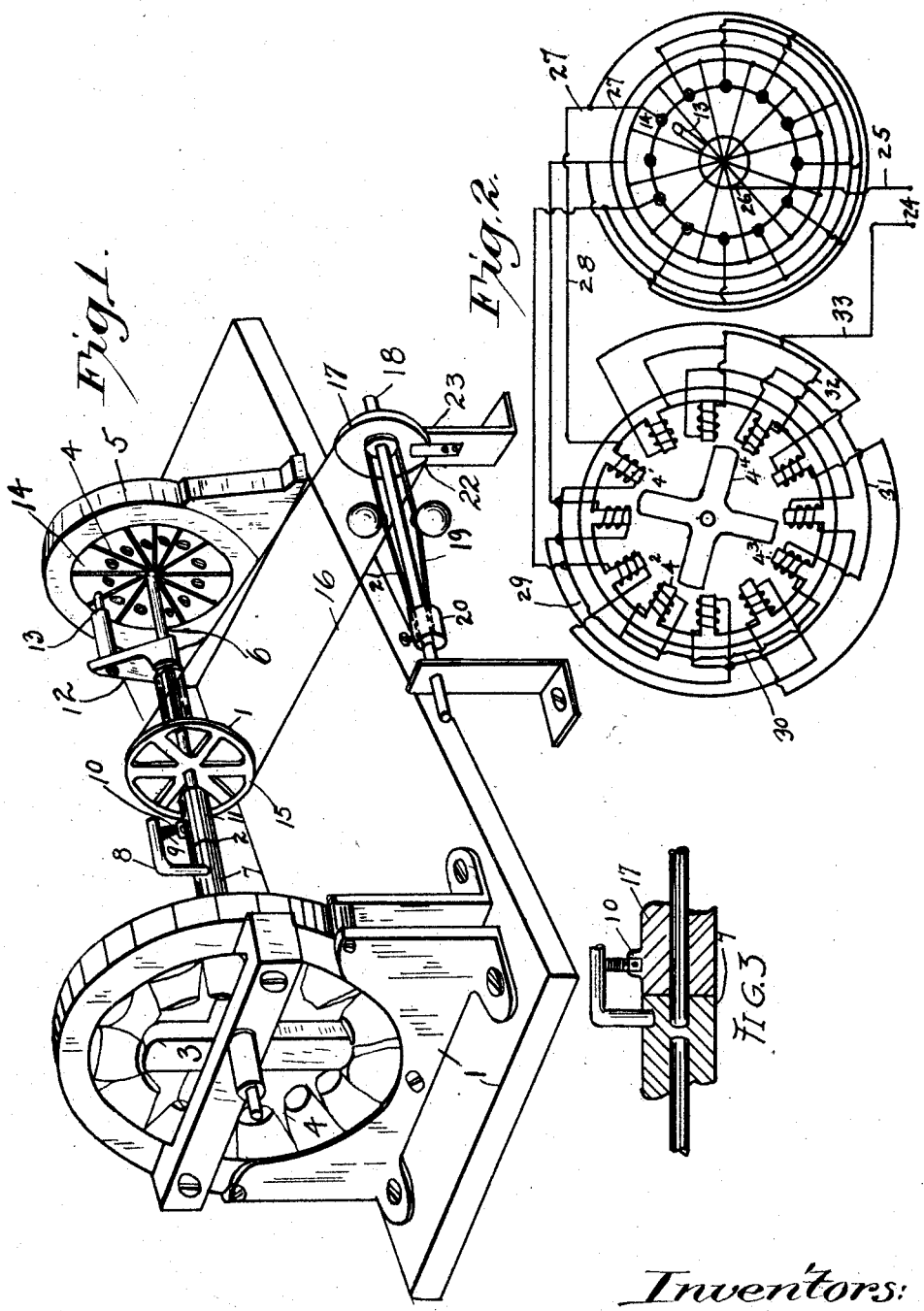
Inventors:
F. W. Adsit
B. B. Bienhoff
BY
Their Attorney

UNITED STATES PATENT OFFICE.

FRANK W. ADSIT AND BENJAMIN B. BIENHOFF, OF MINNEAPOLIS, MINNESOTA.

MOTOR-SPEED CONTROL.

1,367,679.           Specification of Letters Patent.       Patented Feb. 8, 1921.

Application filed March 1, 1919. Serial No. 280,182.

*To all whom it may concern:*

Be it known that we, FRANK W. ADSIT and BENJAMIN B. BIENHOFF, both citizens of the United States, and residents of Minneapolis, in the county of Hennepin and State of Minnesota, have invented certain new and useful Improvements in Motor-Speed Control, of which the following is a specification.

One object of our invention is to provide a motor speed control whereby the speed of a motor may be readily and positively controlled.

Another object of our invention is to provide means for driving an electric motor at a low rate of speed with a maximum torque.

With these and incidental objects in view the invention consists of certain novel features of construction and combination of parts, the essential elements of which are hereinafter described with reference to the drawing which accompanies and forms a part of this specification.

In the drawing Figure 1 is a perspective view of a simple type of motor embodying our invention. Fig. 2 is a diagrammatic view of the wiring of the field and the commutator, and Fig. 3 is a longitudinal section of the resilient connection between the armature shaft and the commutator shaft.

As shown in the drawing, the simple motor comprises a frame 1, a shaft 2 journaled in the frame and carrying thereon a cross-shaped armature 3 which, in the illustration shown, has no winding, and multiple field coils 4.

Carried by the frame is a stationary commutator 5 in which is journaled a brush shaft 6, the other end of the shaft being journaled at 7 in the armature shaft 2.

A pin 8 is connected by the spring 9 to the ear 10 carried by the sleeve 11, rigidly fastened to the brush shaft, and the brush holder 12 is likewise rigidly fastened to the brush shaft 6 and carries thereon a brush 13 making resilient contact with the segments 14 of the stationary commutator 5.

It is evident that if the armature shaft is rotated, the brush shaft 6 will be rotated through the spring 9 and the brush 13 will follow the armature 3 with a certain amount of lead, and the amount of this lead will depend upon the resistance to rotation of the brush shaft 6.

Driven by the brush shaft 6 is a pulley 15 driving, by belt 16, a pulley 17 mounted on and driving the governor shaft 18 on which a centrifugal governor 19 is mounted.

A sleeve 20, frictionally held on the shaft 6 and slidable therein, determines the strength of the governor springs 21 by the amount of these springs which are overlapped by the sleeve 20.

A drag 22, carried by the mounting plate 23, is adapted to impinge on the pulley 17 when the shaft 6 is rotated at a given speed, and the amount of the drag will be determined by the speed of the shaft, and also it is obvious that the drag thus put upon the pulley 17 will be transmitted through the belt 16 to the pulley 15, and through the flexibility of the spring 9 will decrease the lead of the brush 13 with respect to the armature 3.

Looking at the diagrammatic circuit shown in Fig. 2, it will be seen that a source of electrical power connected at 24 will form a circuit through the brush shaft, brush, one of the commutator segments and four of the armature coils, an illustrative circuit being traced as follows:

Source of potential 24, wire 25, brush shaft at 26, brush 13, commutator segment 14, wires 27 and 28, coil 4', wire 29, coil $4^2$, wire 30, coil $4^3$, wire 31, coil $4^4$, wires 32 and 33, to the other side of the source of potential 24.

The position of the cross shaped armature is such that it is attracted by these energized coils and the armature shaft rotated thereby, and if no drag is applied the motor will rotate at a given rate of speed regardless of the load driven up to the limit of the power of the motor. However, if a drag is placed on the brush shaft it is evident the lead of the brush with respect to the armature will be decreased and hence the armature will not have as high speed as it had with the greater brush lead.

Inasmuch as the torque of the motor will depend directly upon the magnetic pull of the coils on the armature, it is evident that, with a slow speed motor, the torque will be uniform, regardless of the speed of the rotation of the armature.

Such a motor may be operated at a speed of one hundred revolutions per minute, or less, and with a considerable torque, and one of its great fields of usefulness is the driving of phonographs, electric signs and the like, where a slow speed of rotation is desired, as these mechanisms can be driven directly by the motor without an interposition of gears or other means of speed reduction, and the motor, from its nature, is free from the noise produced by high speed motors and the noise produced by most speed reduction devices.

While we have shown in the drawing and described herein a simple form of motor using a rotating brush and a stationary commutator, we wish it understood that the invention contemplates broadly any equivalent means of motor control such as a rotating commutator with stationary brush or brushes, and the ordinary type of motor can be so controlled by having a flexible connection between the commutator and armature.

While we have described our invention and illustrated it in one particular design, we do not wish it understood that we limit ourselves to this construction, as it is evident that the application of the invention may be varied in many ways within the scope of the following claims:

1. In motor speed control devices the combination of field coils, an armature shaft having an armature thereon, a brush driven by said armature shaft through a resilient connection, commutator segments associated with said brush and electrically connected with said field coils, and means for putting a drag on said brush.

2. In motor speed control devices the combination of field coils, an armature shaft having an armature thereon, a brush driven by said armature shaft through a resilient connection, commutator segments associated with said brush and electrically connected with said field coils, means for putting a drag on said brush, and a speed controlled governor for determining the amount of said drag.

FRANK W. ADSIT.
BENJAMIN B. BIENHOFF.